(12) United States Patent
Lalitnuntikul et al.

(10) Patent No.: US 9,535,435 B2
(45) Date of Patent: Jan. 3, 2017

(54) POWER ADAPTER FOR DYNAMICALLY ADJUSTING OUTPUT VOLTAGE AND POWER SUPPLY SYSTEM WITH THE SAME

(71) Applicant: Delta Electronics (Thailand) Public Co., Ltd., Amphur Muang, Samutprakam (TH)

(72) Inventors: Pornchai Lalitnuntikul, Samutprakarn (TH); Chaiya Mongkhon, Samutprakarn (TH)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 909 days.

(21) Appl. No.: 13/850,933

(22) Filed: Mar. 26, 2013

(65) Prior Publication Data
US 2014/0125131 A1   May 8, 2014

(30) Foreign Application Priority Data
Nov. 6, 2012   (TW) ............... 101141111 A

(51) Int. Cl.
*G05F 1/00*   (2006.01)
*G05F 1/10*   (2006.01)
(Continued)

(52) U.S. Cl.
CPC ............. *G05F 1/10* (2013.01); *G06F 1/266* (2013.01); *H02J 7/04* (2013.01); *H02J 7/0072* (2013.01);
(Continued)

(58) Field of Classification Search
CPC ........................................ G05F 1/00
See application file for complete search history.

(56) References Cited

U.S. PATENT DOCUMENTS 5,963,015 A  * 10/1999 Lee ................................ 320/128
6,847,131 B2 *  1/2005 Nakamura ....................... 307/85
(Continued)

FOREIGN PATENT DOCUMENTS

CN         1249827      4/2000
CN       201004606      1/2008
(Continued)

*Primary Examiner* — Rexford Barnie
*Assistant Examiner* — Daniel Kessie
(74) *Attorney, Agent, or Firm* — Kirton McConkie; Evan R. Witt

(57) ABSTRACT

A power adapter includes a power converting circuit, a current detecting circuit, and a controlling unit. A charging voltage with a constant voltage level is provided by the hub through the connecting ports. The current detecting circuit is used for detecting a load current and outputting a corresponding current detecting signal. The load current is transmitted from the power converting circuit to the hub through the power cable. A look-up table is stored in the controlling unit for recording a relationship between the load current and a voltage drop across an impedance of the power cable. According to the current detecting signal and the look-up table, the controlling unit issues a feedback signal to the power converting circuit. According to the feedback signal, a level of the output voltage is dynamically adjusted to be equal to the sum of the voltage drop and the charging voltage.

9 Claims, 4 Drawing Sheets

(51) Int. Cl.
*G06F 1/26* (2006.01)
*H02J 7/04* (2006.01)
*H02J 7/00* (2006.01)

(52) U.S. Cl.
CPC ....... *H02J 2007/006* (2013.01); *Y10T 307/406* (2015.04)

(56) References Cited

U.S. PATENT DOCUMENTS

| | | | |
|---|---|---|---|
| 2004/0113585 A1 | 6/2004 | Stanesti et al. | |
| 2007/0029975 A1 | 2/2007 | Martin et al. | |
| 2009/0268491 A1* | 10/2009 | Wilson | 363/78 |
| 2011/0221604 A1 | 9/2011 | Johnson | |
| 2012/0194141 A1* | 8/2012 | Shi et al. | 320/137 |
| 2013/0162226 A1* | 6/2013 | Su et al. | 323/234 |

FOREIGN PATENT DOCUMENTS

| | | |
|---|---|---|
| CN | 101400205 | 4/2009 |
| CN | 101674008 | 3/2010 |
| CN | 101714817 | 5/2010 |
| CN | 102448777 | 5/2012 |
| EP | 2043242 | 9/2008 |

* cited by examiner

POWER ADAPTER FOR DYNAMICALLY ADJUSTING OUTPUT VOLTAGE AND POWER SUPPLY SYSTEM WITH THE SAME

FIELD OF THE INVENTION

The present invention relates to a power adapter, and more particularly to a power adapter for dynamically adjusting an output voltage. The present invention also relates to a power supply system with the power adapter.

BACKGROUND OF THE INVENTION

With increasing development of science and technology, portable electronic devices such as smart phones, tablet personal computers or MP3 players are now rapidly gaining in popularity. Generally, these portable electronic devices are powered by a fixed voltage (e.g. 5V). Each of the portable electronic devices is usually equipped with at least one first connecting port (e.g. USB port). Via the first connecting port, the portable electronic device is connected with a power supply system to receive a charging voltage.

Generally, the power supply system comprises a power adapter, a power cable, and a USB hub. The USB hub comprises plural second connecting ports (e.g. USB ports). The plural second connecting ports of the USB hub may be connected with the first connecting ports of corresponding portable electronic devices. The power adapter is used for receiving an input voltage (e.g. an AC voltage from a utility power source) and converting the input voltage into an output voltage (e.g. 5V) for powering the portable electronic devices. The power cable is connected between the power adapter and the USB hub. Through the power cable, the output voltage from the power adapter may be transmitted to the USB hub. After the first connecting ports of the portable electronic devices are connected with the second connecting ports of the USB hub, the electric energy of the output voltage may be transmitted to the portable electronic devices to charge the portable electronic devices.

As known, the length of the power cable is related to a corresponding impedance value of the power cable. As the length of the power cable is increased, the impedance value is increased. Since the level of the output voltage from the power adapter is fixed, the output voltage is subjected to a voltage drop. Due to the voltage drop, the voltage level at the USB hub is smaller than the level of the output voltage from the power adapter. Under this circumstance, the voltage level provided by the USB hub possibly fails to reach the desired voltage level for powering the portable electronic devices. Moreover, as the number of the portable electronic devices connected with the USB hub is increased, the magnitude of a load current outputted from the power adapter is increased, and the voltage drop across the power cable is increased. Under this circumstance, the voltage level at the USB hub is further decreased. Due to the impedance of the power cable, the voltage level provided by the USB hub possibly fails to reach the desired voltage level for powering the portable electronic devices. If the voltage level provided by the USB hub is insufficient, the chargeable batteries of the portable electronic devices fail to be fully charged and thus the aging conditions of the chargeable batteries are accelerated. Under this circumstance, the endurance of the chargeable batteries will be impaired.

Therefore, there is a need of providing an improved power adapter for dynamically adjusting an output voltage in order to obviate the above drawbacks. Consequently, the level of the output voltage from the power adapter is correspondingly adjusted according to the voltage drop resulting from the impedance of the power cable.

SUMMARY OF THE INVENTION

The present invention provides a power adapter for dynamically adjusting an output voltage and a power supply system with the power adapter. The power adapter is connected with a hub through a power cable. The power adapter comprises a power converting circuit, a current detecting circuit, and a controlling unit. A look-up table is stored in the controlling unit for recording a relationship between a load current and a voltage drop across an impedance of the power cable. According to a current detecting signal from the current detecting circuit, the controlling unit may realize the magnitude of the load current and realize the voltage drop across the power cable according to the look-up table. Consequently, the power converting circuit is driven to increase the level of the output voltage to a magnitude equal to the sum of a charging voltage and the voltage drop. When the output voltage from the power converting circuit is transmitted to the hub through the power cable, the voltage level provided by the hub possibly can reach the desired voltage level for powering the portable electronic devices. In other words, the portable electronic device can be normally operated and the use life of the chargeable battery within the portable electronic device can be extended.

In accordance with an aspect of the present invention, there is provided a power adapter connectable with a hub through a power cable. The hub has plural connecting ports. The power adapter includes a power converting circuit, a current detecting circuit, and a controlling unit. The power converting circuit is used for receiving an input voltage and converting the input voltage into an output voltage. The output voltage is outputted from an output terminal of the power adapter, and electric energy of the output voltage is transmitted to the hub through the power cable, so that a charging voltage with a constant voltage level is provided by the hub through the connecting ports. The current detecting circuit is connected with the power converting circuit for detecting a load current and outputting a corresponding current detecting signal. The load current is transmitted from the power converting circuit to the hub through the power cable. The controlling unit is connected with the current detecting circuit and the power converting circuit for receiving the current detecting signal. A look-up table is stored in the controlling unit for recording a relationship between the load current and a voltage drop across an impedance of the power cable. According to the current detecting signal and the look-up table, the controlling unit issues a feedback signal to the power converting circuit. According to the feedback signal, the power converting circuit is driven to dynamically adjust a level of the output voltage to be equal to the sum of the voltage drop and the charging voltage.

In accordance with another aspect of the present invention, there is provided a power supply system. The power supply system includes a power cable, a hub, and a power adapter. The hub is connected with the power cable, and includes at least one connecting port. The power adapter is connected with the hub through the power cable. The power adapter includes a power converting circuit, a current detecting circuit, and a controlling unit. The power converting circuit is used for receiving an input voltage and converting the input voltage into an output voltage. The output voltage is outputted from an output terminal of the power adapter, and electric energy of the output voltage is transmitted to the hub through the power cable, so that a charging voltage with a constant voltage level is provided by the hub through the connecting ports. The current detecting circuit is connected with the power converting circuit for detecting a load current and outputting a corresponding current detecting signal. The load current is transmitted from the power converting circuit to the hub through the power cable. The controlling unit is connected with the current detecting circuit and the power converting circuit for receiving the current detecting signal. A look-up table is stored in the controlling unit for recording a relationship between the load current and a voltage drop across an impedance of the power cable. According to the current detecting signal and the look-up table, the controlling unit issues a feedback signal to the power converting circuit. According to the feedback signal, the power converting circuit is driven to dynamically adjust a level of the output voltage to be equal to the sum of the voltage drop and the charging voltage.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
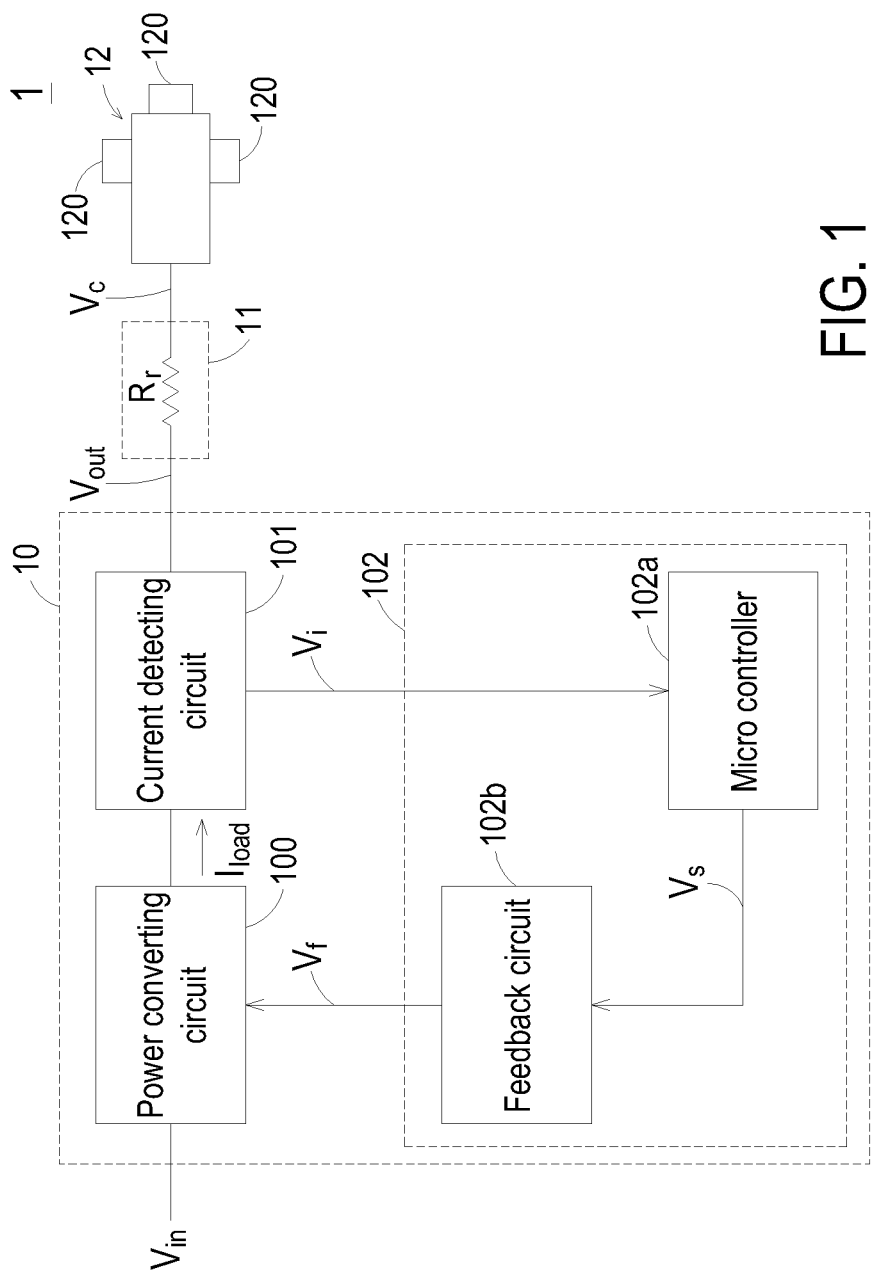
FIG. 1 is a schematic circuit diagram illustrating a power supply system according to an embodiment of the present invention.

FIG. 1 is a schematic circuit diagram illustrating a power supply system according to an embodiment of the present invention. The power supply system 1 is detachably connected with at least one portable electronic device (not shown). The power supply system 1 is used for receiving an input voltage $V_{in}$ (e.g. an AC voltage from a utility power source) and converting the input voltage $V_{in}$ into a fixed charging voltage (e.g. 5V) for charging the at least one portable electronic device. As shown in FIG. 1, the power supply system 1 comprises a power adapter 10, a power cable 11, and a hub 12. The hub 12 comprises plural connecting ports 120. For example, the connecting ports 120 are USB ports. After the connecting ports of one or more portable electronic devices are connected with corresponding connecting ports 120 of the hub 12, the charging voltage $V_c$ from the power supply system 1 may be transmitted to the corresponding portable electronic devices through the connecting ports 120 of the hub 12. Moreover, a first end of the power cable 11 is connected with the hub 12, and a second end of the power cable 11 is detachably connected with the power adapter 10.

In an embodiment, the power adapter 10 is an AC/DC power adapter for receiving the AC input voltage $V_{in}$ and converting the AC input voltage $V_{in}$ into a DC output voltage $V_{out}$. The power adapter 10 comprises a power converting circuit 100, a current detecting circuit 101, and a controlling unit 102.

The power converting circuit 100 is an AC/DC power converting circuit. The power converting circuit 100 is connected between an input terminal and an output terminal of the power adapter 10. The input voltage $V_{in}$ is received by the power converting circuit 100. By alternately turning on and turning off a switching circuit (not shown) within the power converting circuit 100, the AC input voltage $V_{in}$ is converted into the DC output voltage $V_{out}$. The DC output voltage $V_{out}$ is outputted from the output terminal of the power adapter 10. The electric energy of the output voltage $V_{out}$ is transmitted to the hub 12 through the power cable 11. Moreover, in a case that a portable electronic device (i.e. a load) is connected with the hub 12, a load current $I_{load}$ is further outputted from the power converting circuit 100. The load current $I_{load}$ is also transmitted to the hub 12 through the power cable 11. The current detecting circuit 101 is connected with an output terminal of the power converting circuit 100 for detecting the load current $I_{load}$ and outputting a corresponding current detecting signal $V_i$.

The controlling unit 102 is connected with the current detecting circuit 101 and the power converting circuit 100. The current detecting signal $V_i$ is received by the controlling unit 102. Moreover, the controlling unit 102 has a look-up table (not shown). The look-up table is previously stored in the controlling unit 102 before the power supply system 1 is produced. The look-up table records a relationship between the load current $I_{load}$ of the power converting circuit 100 and a voltage drop across a resistor $R_r$ of the power cable 11. The resistor $R_r$ has a constant impedance value. In a case that the load current $I_{load}$ is within a specified range, the relationships between different magnitudes of the load current $I_{load}$ are correlated with the voltage drops of flowing the load current $I_{load}$ through the resistor $R_r$ of the power cable 11. According to the current detecting signal $V_i$ and the look-up table, the controlling unit 102 issues a feedback signal $V_f$ to the power converting circuit 100. According to the feedback signal $V_f$, a level of the output voltage $V_{out}$ is dynamically adjusted by the power converting circuit 100.

In this embodiment, the controlling unit 102 comprises a micro controller 102a and a feedback circuit 102b. The micro controller 102a is connected with the feedback circuit 102b. Moreover, the look-up table has been previously stored in the micro controller 102a. According to the current detecting signal $V_i$ and the look-up table, the micro controller 102a issues a control signal $V_s$. The feedback circuit 102b is connected with the micro controller 102a and the power converting circuit 100. According to the control signal $V_s$, the feedback circuit 102b issues the feedback signal $V_f$ to the switching circuit of the power converting circuit 100. The feedback signal $V_f$ is a pulse width modulation (PWM) signal. According to feedback signal $V_f$, the duty cycle of the switching circuit is changed. Consequently, the level of the output voltage $V_{out}$ is dynamically adjusted by the power converting circuit 100.

Hereinafter, the operations of the power supply system 1 will be illustrated with reference to FIG. 1. Generally, after the power supply system 1 is produced, the length of the power cable 11 is fixed, so that the impedance value of the resistor $R_r$ of the power cable 11 is fixed. Before the power supply system 1 is produced, the magnitudes of the load current $I_{load}$ are changed and the corresponding voltage drops across the resistor $R_r$ of the power cable 11 are measured. The relationships between the magnitudes of the load current $I_{load}$ and the corresponding voltage drops are correlated with each other and recorded as the look-up table. Consequently, the look-up table can be previously stored to the micro controller 102a of the controlling unit 102.

Consequently, when the power adapter 10 is connected with the power cable 11 and the load current $I_{load}$ from the power converting circuit 100 is transmitted to the hub 12 through the power cable 11, the micro controller 102a may realize the magnitude of the load current $I_{load}$ according to the current detecting signal $V_i$ and realize the voltage drop of flowing the load current $I_{load}$ across the power cable 11 according to the look-up table. In other words, according to the feedback signal $V_f$ issued by the feedback circuit 102b of the controlling unit 102, the power converting circuit 100 is driven to increase the level of the output voltage $V_{out}$ to a magnitude equal to the sum of the charging voltage $V_c$ and the voltage drop across the power cable 11. Consequently, after the voltage drop is subtracted from the output voltage $V_{out}$, the charging voltage $V_c$ outputted from the connecting port 120 of the hub 12 can reach the desired voltage level for powering the portable electronic devices. In a case that more portable electronic devices are connected with the connecting ports 120 of the hub 12, the magnitude of the load current $I_{load}$ from the power converting circuit 100 is increased and the voltage drop of flowing the load current $I_{load}$ across the power cable 11 is increased. Under this circumstance, micro controller 102a may realize the magnitude of the load current $I_{load}$ according to the current detecting signal $V_i$ and realize the voltage drop of flowing the load current $I_{load}$ across the power cable 11 according to the look-up table. According to the feedback signal $V_f$ issued by the feedback circuit 102b of the controlling unit 102, the power converting circuit 100 is driven to increase the level of the output voltage $V_{out}$ to a magnitude equal to the sum of the charging voltage $V_c$ and the voltage drop across the power cable 11.

In an embodiment, the power cable 11 comprises a positive wire and a negative wire (i.e. a ground wire). Alternatively, in some other embodiments, the power cable 11 comprises a positive wire, a negative wire (i.e. a ground wire), and a communication wire. Through the communication wire, the hub and the power adapter can be in communication with each other for exchanging signals. Moreover, in some embodiments, the power cable 11 is integrally formed with the hub 12. Under this circumstance, the power cable 11 fails to be detached from the hub 12.

Figure 2:
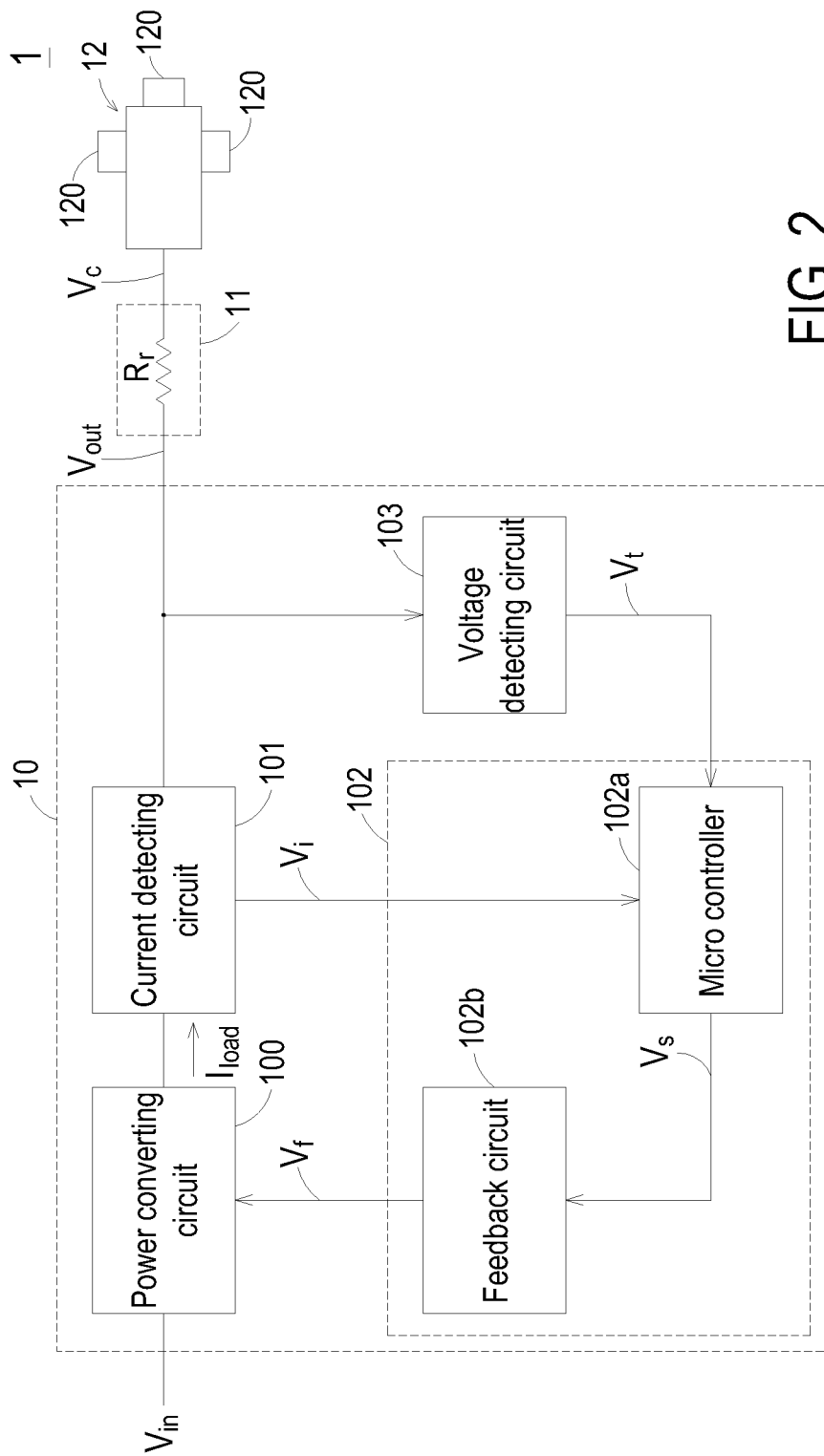
FIG. 2 is a schematic circuit diagram illustrating a power supply system according to another embodiment of the present invention.

In some situations, if there are some errors in circuitry and the electronic components of the power converting circuit 100, the power converting circuit 100 may fail to increase the level of the output voltage $V_{out}$ to a magnitude equal to the sum of the charging voltage $V_c$ and the voltage drop according to the feedback signal $V_f$. For solving this drawback, as shown in FIG. 2, the power adapter 10 further comprises a voltage detecting circuit 103. The voltage detecting circuit 103 is connected with the output terminal of the power converting circuit 100 and the output terminal of the power adapter 10. Moreover, the voltage detecting circuit 103 is also connected with the controlling unit 102. The voltage detecting circuit 103 is used for detecting the output voltage $V_{out}$ and outputting a corresponding voltage detecting signal $V_t$. According to the voltage detecting signal $V_t$, the controlling unit 102 may judge whether the output voltage $V_{out}$ from the power converting circuit 100 complies with the contents of the look-up table (i.e. the corresponding load current $I_{load}$). That is, by judging whether the output voltage $V_{out}$ is equal to the sum of the charging voltage $V_c$ and the voltage drop, the controlling unit 102 may correspondingly adjust the feedback signal $V_f$. If the level of the output voltage $V_{out}$ is lower than the sum of the charging voltage $V_c$ and the voltage drop, the adjusted feedback signal $V_f$ may further drive the power converting circuit 100 to increase the level of the output voltage $\backslash V_{out}$ to the sum of the charging voltage $V_c$ and the voltage drop. In other words, the voltage detecting circuit 103 is capable of confirming whether the output voltage $V_{out}$ is equal to the sum of the charging voltage $V_c$ and the voltage drop.

Figure 3:
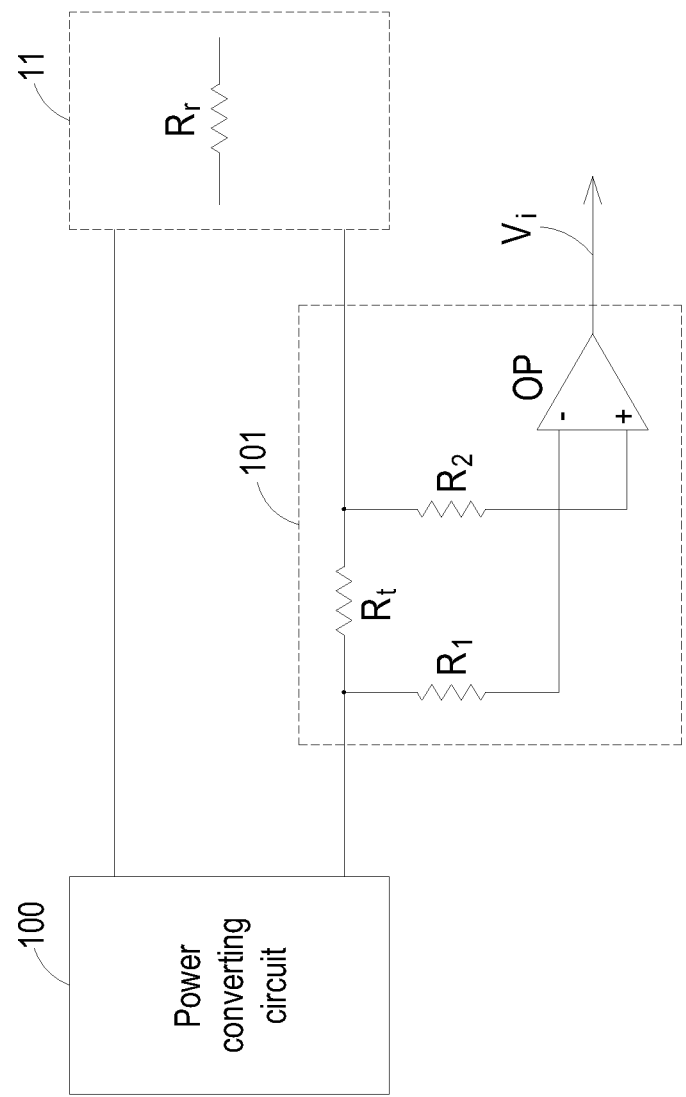
FIG. 3 is a schematic circuit diagram illustrating the relationship between the current detecting circuit, the power converting circuit and the power cable of the power supply system of FIG. 1.

FIG. 3 is a schematic circuit diagram illustrating the relationship between the current detecting circuit, the power converting circuit and the power cable of the power supply system of FIG. 1. The current detecting circuit 101 comprises a detecting resistor $R_t$ and an error amplifier OP. The detecting resistor $R_t$ is connected between the power converting circuit 100 and the output terminal of the power adapter 10. An inverting input terminal of the error amplifier OP is connected with a first end of the detecting resistor $R_t$ and the power converting circuit 100 through a first resistor $R_1$. A non-inverting input terminal of the error amplifier OP is connected with a second end of the detecting resistor $R_t$ through a second resistor $R_2$. An output terminal of the error amplifier OP is connected with the controlling unit 102. In addition, the current detecting signal V, is outputted from the output terminal of the error amplifier OP.

Figure 4:
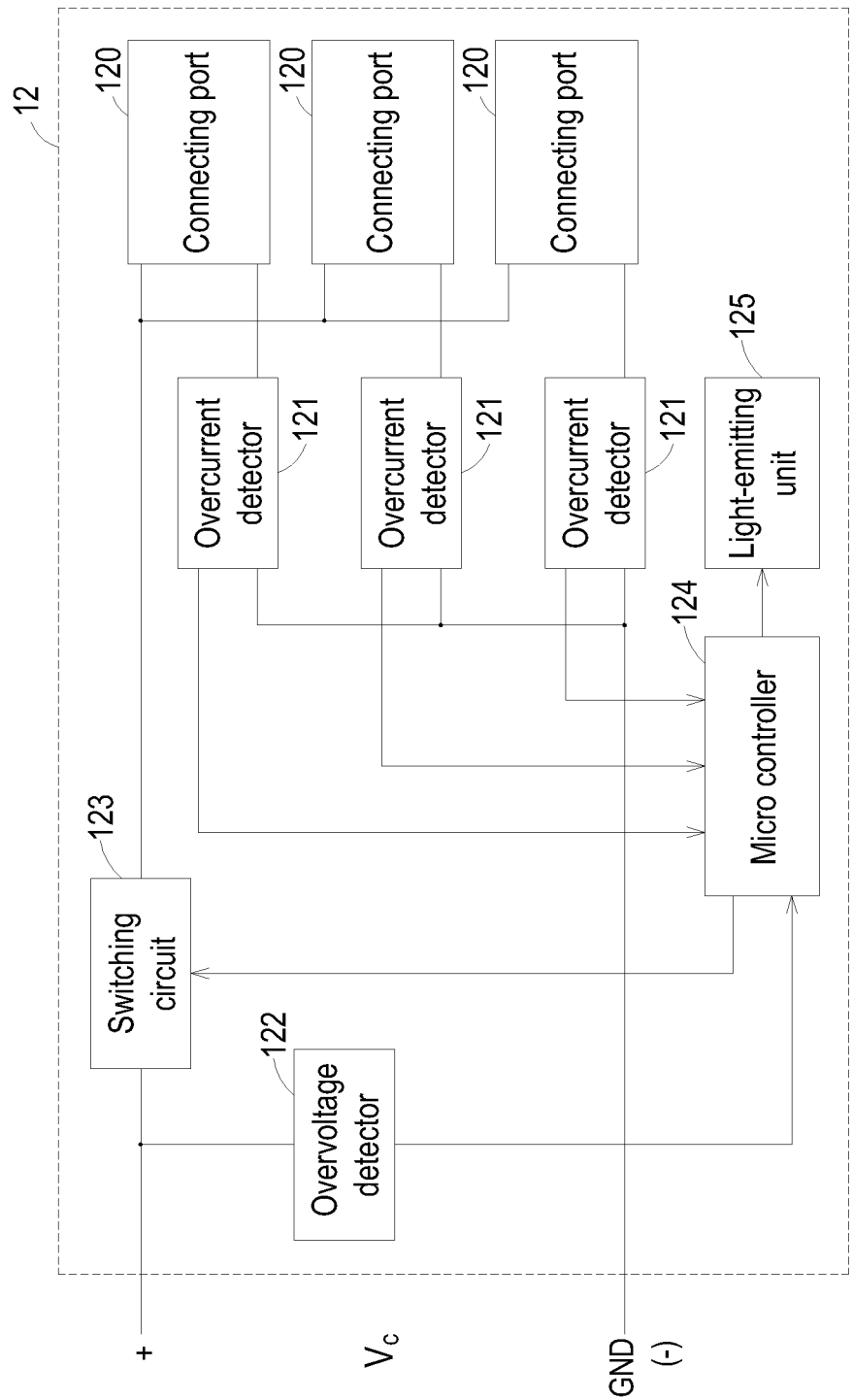
FIG. 4 is a schematic detailed circuit diagram illustrating the hub of the power supply system of FIG. 1.

FIG. 4 is a schematic detailed circuit diagram illustrating the hub of the power supply system of FIG. 1. In addition to the plural connecting ports 120, the hub 12 further comprises plural overcurrent detectors 121, an overvoltage detector 122, a switching circuit 123, a micro controller 124, and a light-emitting unit 125. The switching circuit 123 is connected with a positive input terminal of the hub 12. Under control of the micro controller 124, the switching circuit 123 is alternately turned on and turned off. Consequently, during normal operations of the hub 12, the switching circuit 123 is turned on. The overvoltage detector 122 is connected with the positive input terminal of the hub 12 and the micro controller 124. The overvoltage detector 122 is used for detecting whether the input terminal of the hub 12 is suffered from an overvoltage condition. In a case that the input terminal of the hub 12 is suffered from the overvoltage condition, the overvoltage detector 122 issues an overvoltage notifying signal to the micro controller 124. In response to the overvoltage notifying signal, the switching circuit 123 is turned off under control of the micro controller 124. Under this circumstance, the electric energy from the power cable 11 fails to be received by the hub 12, so that the hub 12 is disabled. The plural overcurrent detectors 121 are connected with corresponding connecting ports 120. Each overcurrent detector 121 is used for detecting whether the corresponding connecting port 120 is suffered from an overcurrent condition. In a case that the connecting port 120 is suffered from the overcurrent condition, the corresponding overcurrent detector 121 issues an overcurrent notifying signal to the micro controller 124. In response to the overcurrent notifying signal, the switching circuit 123 is turned off under control of the micro controller 124. Under this circumstance, the electric energy from the power cable 11 fails to be received by the hub 12, so that the hub 12 is disabled. The light-emitting unit 125 is connected with the micro controller 124. In a case that the switching circuit 123 is turned off under control of the micro controller 124, the light-emitting unit 125 is controlled by the micro controller 124 to emit a light beam in order to notify the user that the hub 12 is in the overvoltage condition or the overcurrent condition.

From the above descriptions, the present invention provides a power adapter for dynamically adjusting an output voltage and a power supply system with the power adapter. The power adapter is connected with a hub through a power cable. The power adapter comprises a power converting circuit, a current detecting circuit, and a controlling unit. A look-up table is stored in the controlling unit for recording a relationship between a load current and a voltage drop across an impedance of the power cable. According to a current detecting signal from the current detecting circuit, the controlling unit may realize the magnitude of the load current and realize the voltage drop across the power cable according to the look-up table. Consequently, the power converting circuit is driven to increase the level of the output voltage to a magnitude equal to the sum of a charging voltage and the voltage drop. When the output voltage from the power converting circuit is transmitted to the hub through the power cable, the voltage level provided by the hub possibly can reach the desired voltage level for powering the portable electronic devices. In other words, the portable electronic device can be normally operated and the use life of the chargeable battery within the portable electronic device can be extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power adapter connectable with a hub through a power cable, said hub having plural connecting ports, said power adapter comprising:
    a power converting circuit for receiving an input voltage and converting said input voltage into an output voltage, wherein said output voltage is outputted from an output terminal of said power adapter, and electric energy of said output voltage is transmitted to said hub through said power cable, so that a charging voltage with a constant voltage level is provided by said hub through said connecting ports;
    a current detecting circuit connected with said power converting circuit for detecting a load current and outputting a corresponding current detecting signal, wherein said load current is transmitted from said power converting circuit to said hub through said power cable; and
    a controlling unit connected with said current detecting circuit and said power converting circuit for receiving said current detecting signal, wherein a look-up table is stored in said controlling unit for recording a relationship between said load current and a voltage drop across an impedance of said power cable, wherein according to said current detecting signal and said look-up table, said controlling unit issues a feedback signal to said power converting circuit, wherein according to said feedback signal, said power converting circuit is driven to dynamically adjust a level of said output voltage to be equal to the sum of said voltage drop and said charging voltage;
    wherein said current detecting circuit comprises: a detecting resistor connected between said power converting circuit and said output terminal of said power adapter; an error amplifier comprising an inverting input terminal, a non-inverting input terminal and an output terminal, wherein said inverting input terminal of said error amplifier is connected with a first end of said detecting resistor and said power converting circuit through a first resistor, said non-inverting input terminal of said error amplifier is connected with a second end of said detecting resistor through a second resistor, and said output terminal of said error amplifier is connected with said controlling unit for outputting said current detecting signal.

2. The power adapter according to claim 1, wherein said controlling unit comprises a micro controller, wherein said micro controller is connected with said current detecting circuit, and said look-up table is stored in said micro controller, wherein according to said current detecting signal and said look-up table, said micro controller issues a control signal.

3. The power adapter according to claim 2, wherein said controlling unit further comprises a feedback circuit, wherein said feedback circuit is connected with said micro controller and said power converting circuit, wherein according to said control signal, said feedback circuit issues said feedback signal, so that said level of said output voltage is dynamically adjusted by said power converting circuit.

4. The power adapter according to claim 1, wherein as said load current is increased, said level of said output voltage is increased by said power converting circuit.

5. The power adapter according to claim 1, wherein said power adapter further comprises a voltage detecting circuit, which is connected with said output terminal of said power converting circuit and said controlling unit for detecting said output voltage and outputting a corresponding voltage detecting signal, wherein according to said voltage detecting signal, said feedback signal is correspondingly adjusted by said controlling unit, wherein if said output voltage is lower than the sum of said voltage drop and said charging voltage, according to said feedback signal, said power converting circuit is further driven to dynamically adjust said level of said output voltage to be equal to the sum of said voltage drop and said charging voltage.

6. A power supply system comprising: a power cable;
    a hub connected with said power cable, and comprising at least one connecting port; and a power adapter connected with said hub through said power cable, and comprising: a power converting circuit for receiving an input voltage and converting said input voltage into an output voltage, wherein said output voltage is outputted from an output terminal of said power adapter, and electric energy of said output voltage is transmitted to said hub through said power cable, so that a charging voltage with a constant voltage level is provided by said hub through said connecting ports;
    a current detecting circuit connected with said power converting circuit for detecting a load current and outputting a corresponding current detecting signal, wherein said load current is transmitted from said power converting circuit to said hub through said power cable;
    a controlling unit connected with said current detecting circuit and said power converting circuit for receiving said current detecting signal, wherein a look-up table is stored in said controlling unit for recording a relationship between said load current and a voltage drop across an impedance of said power cable, wherein according to said current detecting signal and said look-up table, said controlling unit issues a feedback signal to said power converting circuit, wherein according to said feedback signal, said power converting circuit is driven to dynamically adjust a level of said output voltage to be equal to the sum of said voltage drop and said charging voltage and wherein said current detecting circuit comprises: a detecting resistor connected between said power converting circuit and said output terminal of said power adapter;

an error amplifier comprising an inverting input terminal, a non-inverting input terminal and an output terminal, wherein said inverting input terminal of said error amplifier is connected with a first end of said detecting resistor and said power converting circuit through a first resistor, said non-inverting input terminal of said error amplifier is connected with a second end of said detecting resistor through a second resistor, and said output terminal of said error amplifier is connected with said controlling unit for outputting said current detecting signal.

7. The power supply system according to claim 6, wherein said power cable comprises a positive wire and a negative wire.

8. The power supply system according to claim 6, wherein said at least one connecting port comprises plural connecting ports.

9. The power supply system according to claim 6, wherein said power cable is integrally formed with said hub.

* * * * *